Oct. 16, 1956  F. BONI, JR  2,766,903
HEAD CLOSURE CONSTRUCTION FOR HEAT EXCHANGERS
Filed Feb. 17, 1953  2 Sheets-Sheet 1

INVENTOR.
*Frank Boni, Jr.*
BY
*Frease & Bishop*
ATTORNEYS

INVENTOR.
Frank Boni, Jr.
BY
Frease & Bishop
ATTORNEYS

2,766,903

HEAD CLOSURE CONSTRUCTION FOR HEAT EXCHANGERS

Frank Boni, Jr., Massillon, Ohio, assignor to The Griscom-Russell Company, Massillon, Ohio, a corporation of Delaware Application February 17, 1953, Serial No. 337,324

3 Claims. (Cl. 220—67)

The invention relates to heat exchangers or pressure vessels and more particularly to head closure construction for heat exchangers.

In prior heat exchanger construction, it has been common practice to provide a closure cover plate for the head of the heat exchanger, and to secure the cover plate to the head by means of a plurality of bolts arranged circumferentially about the plate and head.

The size and number of head cover plate bolts required to contain the hydrostatic pressure in a heat exchanger increase as the pressure increases; and with the trend to the use of higher and higher pressures in the art, such as say 3500 pounds per square inch, it becomes impractical to use bolts for securing the head closure plate to a heat exchanger head because of the extremely large size and number thereof indicated by calculations using a proper safety factor.

Further, tremendous difficulties have been encountered in properly sealing the head closures of pressure vessels containing high pressures wherein the heads are closed by bolted cover plates.

In certain prior constructions one set of bolts is used to secure the cover plate to the vessel and at the same time to seat a gasket in sealing condition intermediate the cover plate and the vessel. In such constructions the sealing gaskets are necessarily subjected to the full hydrostatic load developed in the vessel and effective direct sealing against such pressures where high pressures are involved is extremely difficult to accomplish.

Further, in addition to high cost of manufacture of bolted constructions, the time and labor necessary to remove and replace bolted cover plates in order to gain entry to the vessel for inspection, repair and general maintenance is very substantial and thus undesirable.

In certain other prior constructions separate gasket seating bolt means have been used apart from the bolts utilized to retain the head cover plate in place. In these constructions it has been possible to arrange and locate the gasket holding bolts so as to avoid subjecting the gasket directly to the full hydrostatic pressure load contained, thereby insuring more efficient and satisfactory sealing characteristics for the head closure. However, such constructions still require cover plate bolts and involve the same difficulties described above.

In addition, in these separately bolted gasket constructions, the time and labor required in removing and replacing cover plates and gaskets is increased since the cover plate and gasket bolts must both be removed. Also, maintenance expense of such construction is high because usually the cover plate must be removed before hold-down adjustments can be made on the gasket seating bolts when attempting to eliminate leaks and the like in the gasket seal.

Still other prior constructions have utilized, with a bolted cover plate, various means other than bolts to seat and retain the gasket separately from the cover plate retaining means. These constructions have accomplished much the same results as the separately bolted cover plate and gasket in that they have enabled taking the full hydrostatic pressure load off the gaskets and have accordingly greatly improved the sealing characteristics of such closures.

However, bolted gasket retainers are believed to be the most satisfactory type of gasket holding means because of the adjustability of circumferentially arranged bolts for leak stoppage and the adjustable balancing of the sealing characteristics of the retainer.

Furthermore, in constructions employing gasket retaining means other than bolts, it is very difficult to locate specific points of gasket leakage, and because these other forms of gasket retainers lack the facilities of adjustability inherent in bolt retainers, correction and repair of leaks is extremely difficult and often impossible short of complete overhaul and replacement.

Still other prior constructions have used means other than bolts to carry the hydrostatic load in securing the cover plate to the head but have always required gasket sealing means for the joint or joints between the cover plate and head and the securing means therefor. The gasket sealing means in such constructions have included either bolts or other retainer means. Thus such constructions encounter the same difficulties discussed above with respect to the individual components thereof. Furthermore, such constructions are extremely expensive to manufacture because of the involved design of and the high machining costs of the individual parts of the constructions.

It is therefore a general object of the present invention to provide a head closure for a heat exchanger which overcomes and eliminates the various difficulties heretofore encountered in closing and sealing the heat exchanger head particularly where high pressures are involved.

It is a primary object of the present invention to provide a closure construction for heat exchangers which eliminates the use of a gasket thereby eliminating those numerous difficulties and problems attendant the use of gaskets in such closures.

Another important object of the present invention lies in the provision of a head closure construction for heat exchangers which eliminates the use of bolts in securing the cover plate to the head thereby eliminating the numerous and difficult problems encountered in using bolts, particularly where high pressures are involved.

A further object and important advantage of the present invention is the provision of a head closure construction for a heat exchanger which provides a complete and leakproof seal without the use of a gasket.

Still another object of the present invention resides in the provision of a heat exchanger head closure construction having the advantages set forth wherein simple and quickly removable means are employed to secure the cover plate to the head, without the use of bolts, which effects a strong and secure closure and which may be removed and replaced in a minimum of time and with a minimum of effort.

It is still a further object of this invention to provide a head closure construction for heat exchangers which permits the elimination of overly bulky flanges, the shortening of the head barrel portion needed to accommodate the cover plate, a reduction in the outside diameter of the cover plate, and other general advantages in the manufacture of the head and closure such as reduced forging and machining costs as compared with bolted closure constructions.

It is another important object of the present invention to provide a heat exchanger head closure construction in which all crevices, corners and obstructions which may be subject to attack by material passing through the heat exchanger are eliminated thereby insuring a construction far less susceptible to damage or failure in use than has been the case with prior constructions.

Still additional objects and advantages of the present construction with respect to its greatly improved characteristics of strength, durability, simplicity and inexpensive design and manufacture, as well as those objects evidenced by the ease, facility and speed with which the closure may be applied and removed will become further evident from the description to follow.

These and other objects are accomplished by the parts, elements, devices, constructions, arrangements, combinations and subcombinations comprising the present invention, the nature of which is set forth in the following general statement, preferred embodiments of which— illustrative of the best modes in which applicant has contemplated applying the principles—are set forth in the following description and illustrated in the accompanying drawings, and which are particularly and distinctly pointed out and set forth in the appended claims forming a part hereof.

In general terms the improved head closure construction for heat exchangers constituting the present invention or discovery may be stated as including in a heat exchanger, a head including a tube sheet portion, and a barrel wall having inlet and outlet openings provided therein, the barrel wall terminating at its open end preferably in an outturned flange, and the head being connected with an end of the heat exchanger shell in which a tube bundle is located certain ends of which are connected to the tube sheet portion; a light gauge, somewhat flexible metallic diaphragm welded continuously about its periphery to the open end of the head barrel wall closing the same; a head cover plate disposed in juxtaposition to the external face of the diaphragm and marginally overlapping the diaphragm adjacent the outturned head flange; and means including a double-flanged, split ring engaging the head flange and the peripheral portion of the cover plate thereby securely locking the cover plate to the head.

By way of example, embodiments of the improved closure construction and component units of said closure, comprising the present invention or discovery, are illustrated in the accompanying drawings forming a part hereof, in which.

Similar numerals refer to similar parts throughout the several views of the drawings.

Figure 1:
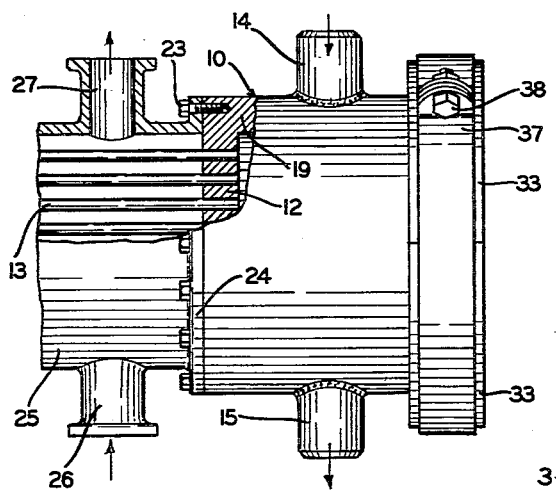
Figure 1 is a fragmentary side elevation of a heat exchanger provided with the improved head closure construction.

While the improved construction of the present invention is equally applicable to various types of pressure vessels, it is shown and described herein as a head closure construction for a heat exchanger wherein reference character 10 generally designates the head member of the heat exchanger. The head member 10 is bolted at 23 or otherwise secured to the flange 24 at one end of the cylindrical shell 25 of the heat exchanger. The shell 25 encloses a series of tubes or tube bundle 13 and is provided with a fluid inlet 26 and fluid outlet 27, and with usual baffles to direct the flow of fluid in the shell from inlet to outlet. The other end of the shell 25, not shown, may be constructed in any usual manner with a removable cap or bonnet; and one end of the tube bundle may be mounted in a tube sheet forming a part of a floating head located within or near to the removable bonnet.

The head member 10, in order to withstand and contain the great internal pressures to which it may be subjected, is usually formed as a heavy walled member of forged steel or other similar material. The head member 10 includes a barrel wall 19 terminating at one end in an open end 11 having an end surface 11a lying in a plane and at its other end in a tube sheet portion 12. The ends of the tubes of the tube bundle 13 are fixed in openings in the tube sheet portion 12. The head barrel wall is also provided with a fluid inlet 14 and a fluid outlet 15.

A baffle partition 16 is located within the head member 10 between the inlet 14 and outlet 15, a portion of the baffle partition 16 originating at the tube sheet portion 12, to which it is secured at 17. The baffle 16 extends outwardly toward the open end 11 of the head 10 and terminates at a spaced distance inwardly of the open end 11. A second partition member 18 is secured to the extended end of the baffle partition 16 and forms a semi-circular or other shaped end closure for that half of the head cavity on the discharge or outlet side of the baffle partition 16. Thus, the head cavity portion above partition 16 and to the right of partition 18, viewing Fig. 3, communicates with inlet 14.

A relatively light gauge and therefore somewhat flexible metallic plate or diaphragm 20, flat as shown, of substantially uniform thickness and substantially the same diameter as the internal diameter of the barrel wall 19 is positioned in the mouth of the open end 11 of the head 10, where it is secured by a continuous weld 21 about its circumferential periphery to the end wall portion 21a at the open end of the head. Thus the thin-walled flat metal diaphragm 20 has inner and outer faces and when assembled by welding, has one surface, its outer surface, lying in the plane of the barrel wall end surface 11a. Such a welded-in plate construction forms a flexible diaphragm closure for the head 10 which is completely sealed by reason of the continuously welded joint at the periphery of the diaphragm 20.

Immediately adjacent the mouth of the open head end 11 and immediately inwardly of and adjacent the diaphragm weld 21 and the end wall portion 21a, the barrel wall 19 is provided with an annular groove 22 of arcuate cross section. This annular groove 22 forms a rounded surface or fillet adjacent the weld 21 and eliminates crevices or sharp corners, which characterize gasket sealed joints, where material can accumulate. Thus any harmful material which might tend to collect at the corner or rounded groove 22 can be cleaned out readily during shut downs. Further, the formation of the groove 22, provides a fin-like end wall portion 21a having one surface lying in the plane of the barrel wall end surface, as shown, for edge to edge welding to the periphery of the diaphragm 20 thus providing ideal welding conditions for the weld 21.

Figure 2:
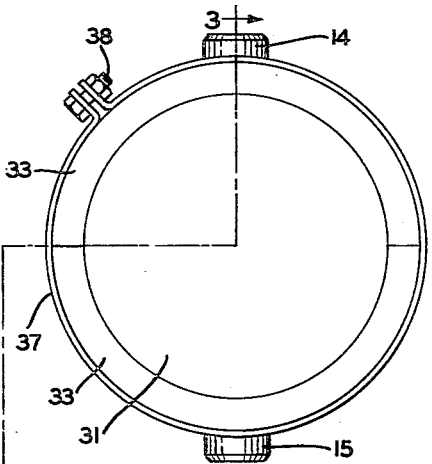
Fig. 2 is an end elevation of the construction shown in Fig. 1.
Figure 3:
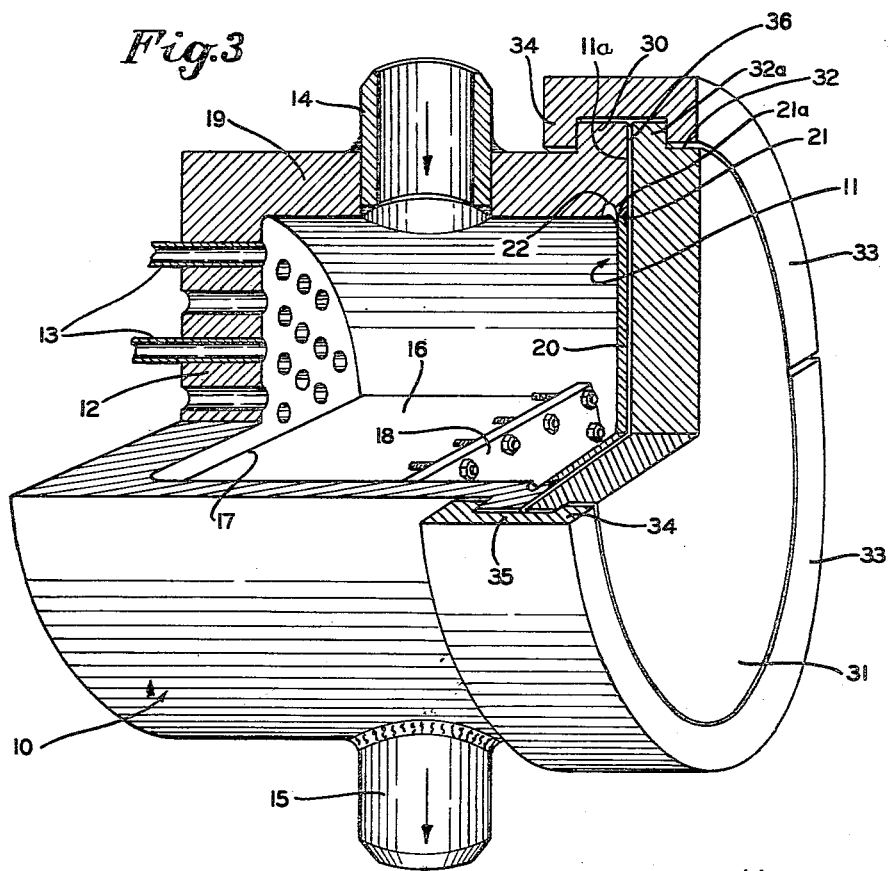
Fig. 3 is a somewhat diagrammatic sectional perspective view taken on the line 3—3, Fig. 2.

In Figs. 1 through 3 there is illustrated a head closure construction for the diaphragm enclosed end of the head of a heat exchanger which is particularly adapted, but not necessarily limited, to containing extremely high pressures.

In Figs. 1 through 3, the heat exchanger head 10 is provided at its open end 11 with an outturned annular flange 30. A circular heavy duty cover or closure plate 31 is positioned adjacent the outer surface or face of the diaphragm plate 20 external to the barrel wall 19. The outer diameter of cover plate 31 is substantially the same as the outer diameter of the head flange 30, and plate 31 is provided at its outer periphery with an annular recess 32 forming a flange portion 32a of lesser thickness than the plate and which is similar in shape to the annular flange 30 on the head.

As shown in Figs. 1 through 3, the cover or closure plate 31 is secured to the open end of the head 10 with the flat inner surface of the plate 31 engaging the flat outer surface of the diaphragm 20 throughout the extent of the diaphragm 20 by means of plural ring segments 33. These ring segments 33 are U-shaped or channel-shaped in cross section permitting the U-shaped ring to be engaged over the two flanges 30 and 32a to interlock the cover plate and the head flange.

The channel-shaped ring segments 33 have inwardly extending annular flange portions 34 and an annular web portion 35, and when the ring segments 33 are assembled, as shown in Fig. 3, with the head 10 and cover plate 31, the inner annular faces of the flanges 34 engage the outer annular faces of the flanges 30 and 32a at locations spaced on either side of the plane of the barrel wall end surface 11a, and the web portions 35 span and surround the welded connection 21 between the diaphragm and the sheet-like portion 21a, radially outward of the weld 21, as shown. The lateral distance between the inner annular faces of the flanges 34 is slightly greater than the combined thicknesses of the head flange 30 and the cover plate flange 32a providing a slight clearance necessary to permit easy assembly of the ring segments 33 with the head and cover plate. This clearance is illustrated somewhat diagrammatically at 36 in Fig. 3 between the head flange 30 and cover plate flange 32a.

The clearance 36, which may be of the order of a few thousandths of an inch, does not cause any difficulty in proper functioning of the closure construction because when pressure is developed within the head 10, the thin walled flexible diaphragm plate 20 is pressed against the cover plate 31, which latter member sustains the pressure. In thus sustaining the pressure, the load tending to separate the cover plate 31 from the head 10 is sustained by the ring segments 33, the load being transmitted through the flanges 30, 34 and 32a.

A sufficient number of ring segments 33 are positioned about the flanges 30 and 32a to form a substantially continuous interlock between the head and cover, and a lock strap 37 or the like is secured, as in Figs. 1 and 2, about the outer circumferences of the split ring segments 33 to hold them in locked or closure position. The lock strap 37 may be tightened to the necessary degree by bolt 38.

The heat exchanger head closure construction described affords a sturdy and efficient closure without the use of bolts or gaskets which thereby eliminates the described difficulties encountered with prior constructions in providing a sealed closure for heat exchangers where high pressures are involved.

In the instant construction, the diaphragm plate 20 seals the head 10 against any and all leakage thereby completely eliminating the need for any gasket, and eliminating the need for gasket bolts and the many disadvantages and difficulties which accompany such use.

Further, in this present construction there is no requirement for cover plate bolts which, as has been pointed out in detail heretofore, relieves the necessity of making provisions in head wall thickness and cover diameter for the unduly large bolts necessary to withstand the full hydrostatic load developed in the head.

The pressure fluids passing into the exchanger through the inlet 14 are entirely contained within the diaphragm plate 20, which by reason of its flexibility expands or flexes outwardly and bears against and is retained by the heavy cover plate 31. The cover plate 31 backs up the diaphragm plate with structural strength in substantial excess of that needed to resist and contain the maximum hydrostatic pressure developed in the exchanger.

In this construction the full hydrostatic pressure contained in the exchanger is exerted against the cover plate through the diaphragm as a transfer medium only, and this entire hydrostatic force or load is in turn transferred through and contained by the split ring segments interlocking the head flange and the extended peripheral cover plate flange.

Hence, as opposed to prior constructions wherein it has been necessary to consider and provide structure for containing two separate loads—the gasket seating load and the hydrostatic pressure load—the present construction requires but a simple coupling arrangement between the head and a cover plate to maintain a perfect seal and at the same time contain the entire hydrostatic load developed in the exchanger.

Figure 4:
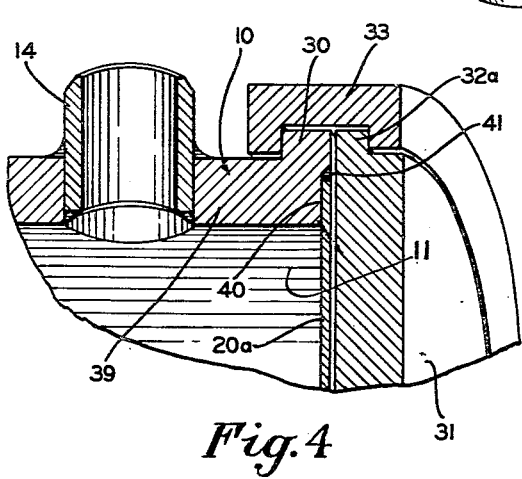
Fig. 4 is a fragmentary view similar to a portion of Fig. 3 showing a modified form of construction.
Figure 5:
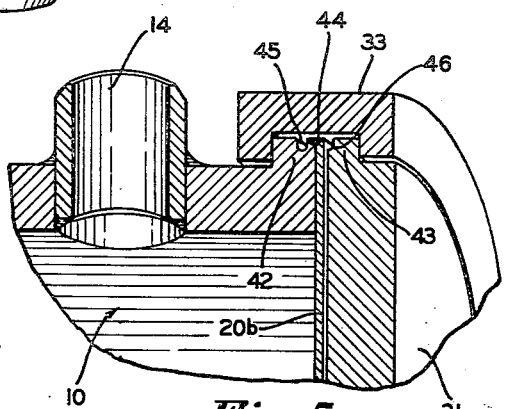
Fig. 5 is a fragmentary view like Fig. 4 showing a further modified form of construction.

Figs. 4 and 5 illustrate two modified constructions by which the diaphragm plate 20 may be secured to the open end of the head to seal the same.

In Fig. 4, a flat diaphragm plate, designated at 20a, is provided which has a diameter greater than the internal diameter of the head 10 and its open end 11, but has a lesser diameter than the outside diameter of the head 10.

The head barrel wall 39 is provided with a countersunk area 40 concentrically about the open end 11 of the inner barrel wall diameter and of substantially the same overall diameter and thickness as the diaphragm plate 20a. The plate 20a is then positioned in the countersunk area 40 covering the open end 11 where it is securely fixed to the head by a weld 41 continuously about its peripheral circumference and with the outer surface of the diaphragm lying in the plane of the end surface of the wall 39. The cover plate 31 is then secured to the head flange 30 by split ring segments 33 in the same manner as heretofore described, so that the flat inner surface of the plate 31 engages the flat outer surface of the diaphragm 20a throughout the extent of the diaphragm.

In Fig. 5, a flat diaphragm plate, generally designated at 20b, is provided which is of substantially the same diameter as the end of the head flange 42 and the same diameter as the cover plate flange 43.

This diaphragm 20b is positioned flush over the open end surface of head flange 42 closing the same and disposing the peripheral edge of the diaphragm 20b in adjacent conformity with the outer peripheral edge of the head flange 42. The diaphragm plate 20b is secured in the aforedescribed position by means of a weld 44 continuously joining its periphery to the peripheral edge of the head flange 42.

In this construction, the head flange 42 is provided in its outer circumferential face or edge with an annular groove 45 of arcuate cross section which is formed immediately inwardly from the flange and continuously adjacent the weld 44 to provide a fin-like end wall portion as shown, similar to the fin-like portion 21a, for proper welding conditions.

In addition, the peripheral edge of the cover plate 31, defined by that face thereof adjacent the diaphragm plate 20b and the outer circumferential edge of flange 43, is inclined outwardly away from the diaphragm as at 46 whereby direct contact between the cover plate and the weld 44 is avoided when the cover plate is secured to the head.

In each of the modified constructions shown in Figs. 4 and 5 the diaphragm plate and cover plate coact in the same manner and for obtaining the same end results as in the construction illustrated in Figs. 1 through 3 and described in detail above.

Figure 6:
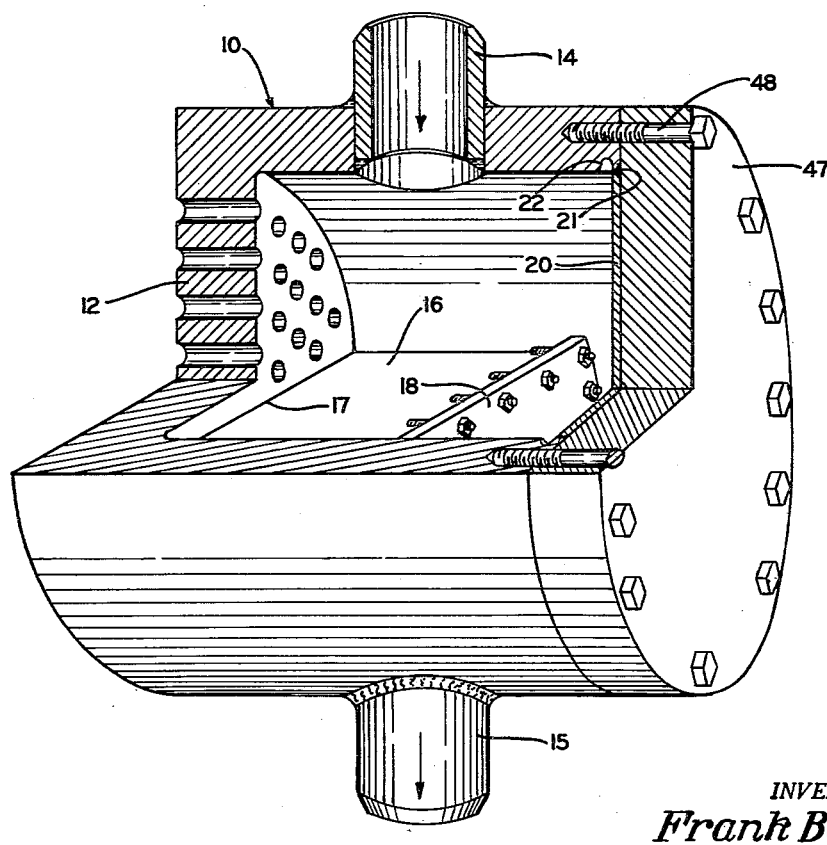
Fig. 6 is a sectional view like Fig. 3 of still a further modification of the head closure construction.

Fig. 6 shows another modified head closure construction which is particularly adapted to containing pressures in the lower ranges.

The only difference in the construction illustrated in Fig. 6 and that illustrated in Fig. 3 and previously described in detail lies in the omission of the flange 30 on the head, and the provision of a bolted-on cover plate.

In Fig. 6 the diaphragm 20 is secured in the mouth of the open end of the head by the same continuous peripheral weld 21.

A cover plate 47, of the same diameter as the outside diameter of the head 10, is positioned with its flat inner surface engaging the flat outer face of the diaphragm 20 in aligned coincidence with the head, to which it is secured by plural radially spaced bolts 48 extending through a concentric peripheral portion of the plate 47 into the end of the head 10.

The bolts 48 securely lock the cover plate against the head end and against the diaphragm plate 20 permitting the diaphragm to completely contain the internal pressure fluids and seal against any leakage, while the bolts 48 take the full hydrostatic load in the head through the diaphragm and cover plate.

Thus, the many advantages inherent in the use of a welded flexible diaphragm in place of gasket requirements are obtained in a bolted cover plate construction for containing relatively low pressures.

When it is necessary to gain entry to the head, the diaphragm may be quickly and easily cut out by means of a torch or the like. Then, to close and reseal the head a new plate may be applied and welded in place thereby providing in the two operations substantial time and labor savings over the requirements of bolted constructions for a similar operation.

The new heat exchanger head closure construction of the present invention provides an arrangement which enables the elimination of gaskets and bolts for high pressure work, thereby overcoming the many difficulties and solving problems which have been so constantly encountered in the use of prior constructions which incorporate gasket and bolt features.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction shown.

Having now described the invention, the construction, the operation and use of preferred embodiments thereof, and the advantageous new and useful results obtained thereby; the new and useful constructions, and reasonable mechanical equivalents thereof obvious to those skilled in the art, are set forth in the appended claims.

I claim:

1. Head closure construction for heat exchangers, including an annular metal head barrel wall, said wall terminating in an annular open end and having an end surface lying in a plane, a flat thin-walled uniform thickness metal diaphragm having inner and outer surfaces and an annular periphery, the barrel wall being provided with an annular fin-like portion having one surface lying in the plane of the barrel wall end surface, the metal diaphragm being welded to the fin-like barrel wall portion continuously about the periphery of the diaphragm at the open end of the barrel wall and with one surface of the diaphragm lying in the plane of the barrel wall end surface, a cover plate external to the barrel wall having a flat inner surface engaging the flat outer surface of the diaphragm throughout the extent of the diaphragm, said external cover plate also overlapping the annular barrel wall end surface throughout the extent of said barrel wall end surface, and means engaging the cover plate and barrel wall at annular locations spaced on either side of the plane of the barrel wall end surface and spanning and surrounding the welded connection between said diaphragm and fin-like barrel wall portion radially outward thereof removably securing said cover plate to the barrel wall in pressure-supporting engagement with the diaphragm.

2. The construction defined in claim 1 in which the barrel wall is provided with an outturned annular flange defining the open end of the barrel and the end surface of the barrel wall, in which the cover plate is provided with a peripheral flange portion, and in which the means removably securing the cover plate to the barrel wall engages the cover plate and barrel wall flanges.

3. The construction defined in claim 1 in which the means engaging the cover plate and barrel wall flanges comprises split ring means surrounding the cover plate and barrel wall flanges, and in which a locking ring is secured about the outer circumference of the split ring means locking the split ring means in interlocking engagement with the annular flanges of the cover plate and barrel wall.

References Cited in the file of this patent

UNITED STATES PATENTS

| 1,824,898 | Johnson | Sept. 29, 1931 |
| 1,911,608 | Davis et al. | May 30, 1933 |
| 2,009,877 | Dodd | July 30, 1935 |
| 2,061,641 | Tinkman | Nov. 24, 1936 |
| 2,316,437 | Kercher | Apr. 13, 1943 |
| 2,389,824 | Smith | Nov. 27, 1945 |
| 2,547,521 | Buehler | Apr. 3, 1951 |
| 2,548,934 | Beaird | Apr. 17, 1951 |
| 2,647,656 | Frisch | Aug. 4, 1953 |

FOREIGN PATENTS

| 678,593 | France | Jan. 2, 1930 |